Feb. 23, 1965  E. F. SCHENK  3,170,821
GRIDLESS TUBULAR ELECTRODE ASSEMBLY FOR STORAGE BATTERIES
Filed Dec. 20, 1962
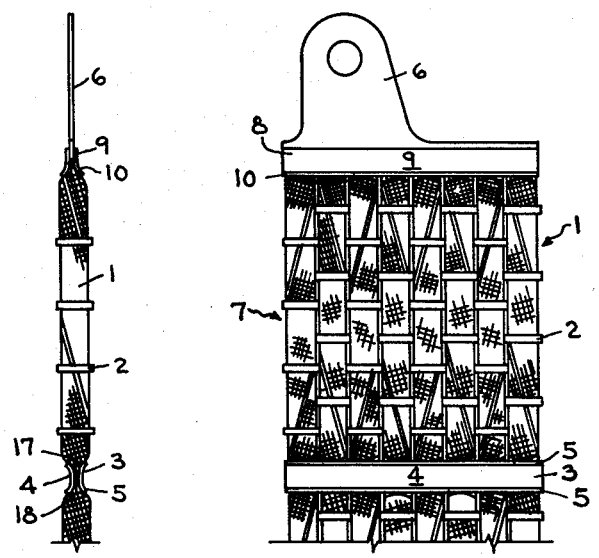
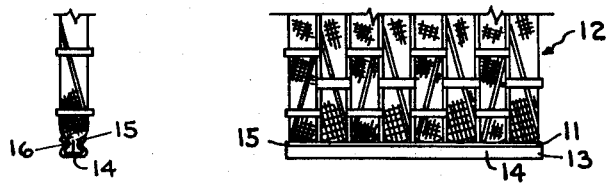
FIG-2   FIG-1
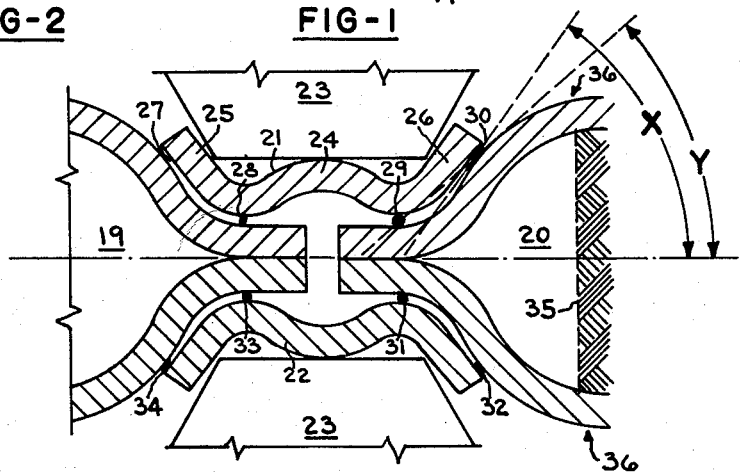
FIG-3
INVENTOR.
ERNEST F. SCHENK

3,170,821
GRIDLESS TUBULAR ELECTRODE ASSEMBLY
FOR STORAGE BATTERIES
Ernest F. Schenk, Bloomfield, N.J., assignor to The
Electric Storage Battery Company, a corporation
of New Jersey
Filed Dec. 20, 1962, Ser. No. 246,119
4 Claims. (Cl. 136—14)

This invention relates to a storage battery electrode and a method of making it. In particular, the invention relates to a tube-type positive electrode whose tubes contain electrochemically active material, generally nickel oxide, and an improved method for preparing such an electrode.

In the storage battery art, tube-type electrodes containing nickel active material are generally used as positive electrodes in Edison (nickel-iron) batteries. These tube-type electrodes are prepared by first producing a metal frame, called a grid, and securing to this grid a plurality of tubes containing nickel active material. Generally 15 tubes are placed in a row and the electrode comprises 2 or more rows of tubes. Actually, more or less than 15 tubes may be used in each row if so desired, and the electrode may comprise only one row of tubes. The grid is formed to have one or more rectangular openings with flanges and integral tongues, corresponding to the number of tubes to be contained therein, along the upper and lower edges of each opening. Both ends of a tube are inserted between a flange and a tongue and the tube is secured to the grid by pressing the tongue against the tube and thereby against the flange. A detailed description of this method of preparing tube-type electrodes may be found in United States Patent No. 896,812, issued to Thomas A. Edison on August 25, 1908.

Tube-type electrodes prepared in accordance with the above-described method have several disadvantages. Electrical contact between a tube and the grid is dependent upon the mechanical pressure between these two members. In many cases, handling of the electrodes during manufacture disturbs these pressure contacts, reducing the pressure of the grid upon the tubes and causing an increase in the electrical resistance. Another disadvantage is that the stamping machinery and tooling used to prepare the grids are very expensive. As a result of this expense and since each different electrode size requires special grid stamping machinery, the variety of electrode sizes is severely limited.

It is an object of this invention to provide an improved tube-type electrode.

Another object of the invention is to provide a tube-type electrode having greater capacity than tube-type electrodes of approximately the same size prepared by current methods.

Still another object is to provide a method for preparing tube-type electrodes which avoids the problem of increased electrical resistance caused by reduced pressure between the tubes and the grid.

A further object is to provide a method for preparing tube-type electrodes permitting flexibility in the manufacture of tube-type electrodes having different size requirements.

A still further object is to provide a gridless tube-type electrode having sufficient rigidity as to permit substantial handling of the electrode during the battery manufacturing process.

Other objects and advantages of this invention will be apparent to those skilled in the art in view of the following description supplemented by the drawings in which:

FIGURE 1 is a side elevation of a portion of a tube-type electrode prepared in accordance with this invention.

FIGURE 2 is an end view of the electrode depicted in FIGURE 1; and

FIGURE 3 is a detailed cross section view of two tube ends, two flanged center rails and welding electrodes about to compress and weld said center rails to said tubes.

It has been discovered that a tube-type electrode having substantial rigidity and increased capacity over similar electrodes made in accordance with current practice can be prepared by aligning the tubes containing the electrochemical active material side by side in a row and thereafter joining two or more rows of tubes by welding tube ends from two different rows between the same pair of flanged center rails. By using the welding technique of this invention, a tube-type electrode can be prepared without using a grid and thereby avoiding the need for expensive stamping machinery and tooling and permitting great versatility in preparing tube-type electrodes of varying sizes. The increased capacity of tube-type electrodes prepared in accordance with this invention is due to the fact that the space ordinarily taken up by the sides of the grid may now be used to accommodate additional tubes. For instance, the space necessary to accommodate an electrode containing 15 tubes per row plus a grid is sufficient for an electrode having 16 tubes per row if prepared in accordance with this invention. In addition, there is excellent electrical contact between the rows of tubes which is not dependent on mechanical pressure between the tubes and a grid.

It has been found that in order to prepare a tube-type electrode in accordance with this invention having substantial rigidity, which is necessary for handling and assembling the electrodes, the angle of the center rail flange and the angle of curvature of the tube ends to be inserted between the center rails is critical. To insure rigidity, the angle of the center rail flange with the horizontal should be less than the angle of curvature of the tube end with the horizontal when the electrode is on its side. This permits the center rail flange to be in direct contact with the tube end, and in fact, the flange slightly deforms the tube end. In this manner, the center rail flanges support the tubes similar to the way a V block supports a rod, and this contributes to the rigidity of the electrodes.

In addition to welding flanged center rails to connect two rows of tubes, a top plate may also be welded to tube ends at the top of the top row of tubes by means of a pair of flanged rails and a flanged bottom strip may be welded to tube ends at the bottom of the bottom row of tubes. After the bottom strip is welded to the tube ends, it may be pinched together to further secure it to the tube ends. The technique of this invention is particularly adapted for tube-type electrodes having two or more rows of tubes. In the event the electrode has only one row of tubes, only a top plate and a flanged bottom strip need be welded to the row of tubes. When two or more rows of tubes are to be connected, the tube ends in adjacent rows should be disposed opposite to one another.

The tubes may be welded to the flanged center rails, top plate or bottom strip by either spot welding or projection welding. In either method of welding, it is essential that the tubes to be welded are held securely in place against each other and in such position that tubes of adjacent rows are opposite to one another. A further advantage of the welding technique of this invention is that it permits continuous automated welding of top plates, center rails and bottom strips to a variable number of rows of tubes, thereby providing an easy and practical method for preparing various sizes of electrodes.

In order to get a better understanding of the purposes and advantages of this invention, reference is now made to the drawings. FIGURE 1 is a side elevation of a portion of a tube-type electrode prepared in accordance with this invention. The tube-type electrode compries tubes 1 which are perforated metal and contain electrochemically active material. Wrapped around each tube are several metal bands 2 which help to structurally support the tubes. Disposed between adjacent rows of tubes and to which each tube is welded are flanged center rails 3 which consist of a web 4 and flanges 5. A top plate 6 is attached to the top row of tubes 7 by means of flanged rails 8 which comprise a web 9 and a flange 10. For the purpose of connecting the top plate, the rail need be flanged at only the edge in contact with the tube ends. The tube ends 11 at the bottom of the bottom row of tubes 12 are supported by a bottom strip 13 which comprises a U-shaped web 14 and flanges 15.

FIGURE 2 shows an end view of the electrode depicted in FIGURE 1 and presents a better view of the flanged rail 8, the pair of flanged center rails 3 and the flanged bottom strip 13. FIGURE 2 clearly shows how the tube ends 17 and 18 are disposed opposite to one another and between the flanged center rails 3 and how the bottom strip may be pinched together at 16.

FIGURE 3 is a cross section view of two tube ends 19 and 20, two flanged center rails 21 and 22, and two welding electrodes 23 about to compress and weld said center rails to said tube ends. Each of the flanged center rails comprises a raised web portion 24 and two flanges 25 and 26. As previously stated, the angle Y which the center rail flange makes with the horizontal should be less than the angle X which is the angle of curvature of the tube end with respect to the horizontal. The angle X may range from about 45° to about 55°, and the angle Y may range from about 30° to about 40° which provides that the angle of the center rail flange (Y) is always less than the angle of the tube end curvature (X).

If the angle of the center rail flanges is less than the angle of the tube end curvature, when the welding is effected, each center rail will be welded to the pointed portion of each tube end 28, 29, 31 and 33 and each center rail flange will be in contact with and slightly deform the curved portion of each tube end at the points indicated by 27, 30, 32 and 34. Contact with each tube end by each center rail is essential to the support of the tubes and is necessary to produce a substantially rigid electrode. The line 35 indicates the approximate location of the active material in the electrode tube. The points 36 are the places where cracks in the tube caused by excessive deforming may appear, especially if the angle of tube curvature is too great.

As used in this specification and the claims which follow, a flanged rail is a metal strip having 1 flange used to connect a top plate to a row of electrode tubes; a flanged center rail is a metal strip having 2 flanges and used to connect adjacent rows of electrode tubes; and a flanged bottom strip is a U-shaped metal strip having 2 flanges and used to enclose the bottom tube ends of the bottom row of electrode tubes.

Having completely described electrodes prepared in accordance with this invention and the methods of preparing them, what is claimed is:

1. A gridless tube-type electrode comprising at least two rows of a plurality of perforated metal tubes vertically arranged side by side and containing electrochemically active material, said perforated metal tubes being closed at each end so that there is a curved portion and a pointed portion which is formed by compressing the end of each metal tube, adjacent rows of said tubes being disposed so that the tube ends of said adjacent rows are opposite to one another, adjacent rows of said tubes being electrically connected to each other by means of a pair of flanged center rails between which the ends of said tubes are placed, said flanged center rails being positioned opposite to one another, each center rail flange being in contact with and slightly deforming the curved portion of each tube end, and the web portion of each flanged center rail being welded to the pointed portion of each tube end so as to produce a substantially rigid electrode structure.

2. A gridless tube-type electrode in accordance with claim 1 in which a top plate is attached to the top of the electrode by means of a pair of flanged rails which are welded to both the top plate and the upper end of the top row of tubes.

3. A gridless tube-type electrode in accordance with claim 2 in which a U-shaped, flanged bottom strip encloses the pointed portion of the bottom end of the bottom row of tubes and is welded to the tube ends of said bottom row of tubes.

4. A gridless tube-type electrode in accordance with claim 3 in which said U-shaped, flanged bottom strip is pinched so as to further secure it to the tube ends.

References Cited by the Examiner

UNITED STATES PATENTS

| | | | |
|---|---|---|---|
| 896,812 | 8/08 | Edison | 136—37.11 |
| 976,791 | 11/10 | Edison et al. | 136—14.1 |
| 1,411,256 | 4/22 | Ameln et al. | 136—37.1 |
| 1,880,249 | 10/32 | Hagspihl | 136—37.1 |

JOHN H. MACK, *Primary Examiner.*